// United States Patent [15] 3,647,944
Anderson [45] Mar. 7, 1972

[54] KINESCOPE BIAS ARRANGEMENT TO PROVIDE BOTH CONSTANT AMPLITUDE DC RESTORATION PULSES AND ARC DISCHARGE PROTECTION

[72] Inventor: George Edward Anderson, Indianapolis, Ind.

[73] Assignee: RCA Corporation

[22] Filed: Aug. 25, 1969

[21] Appl. No.: 852,639

[52] U.S. Cl. ....................178/5.4 R, 178/7.5 DC
[51] Int. Cl. ....................H04n 5/18
[58] Field of Search ....................178/5.4 R, 7.3 DC, 7.5 DC, 178/7.3 R, 7.5 R; 307/237, 264, 297, 318; 328/173, 217, 226; 315/27 TD

[56] References Cited

UNITED STATES PATENTS

| | | | |
|---|---|---|---|
| 2,832,822 | 4/1958 | Rogers | 178/7.5 DC |
| 3,173,025 | 3/1965 | Davidson | 307/318 |
| 3,373,370 | 3/1968 | Letsinger | 307/318 |
| 3,422,282 | 1/1969 | Orrell, Jr. | 307/237 |
| 3,466,390 | 9/1969 | Inamiya et al. | 178/7.5 E |
| 3,499,104 | 3/1970 | Austin | 178/5.4 |
| 3,535,436 | 10/1970 | Limberg | 178/7.5 DC |
| 3,555,175 | 1/1971 | Griepentrog | 178/7.5 R |

*Primary Examiner*—Robert L. Griffin
*Assistant Examiner*—George G. Stellar
*Attorney*—Eugene M. Whitacre

[57] ABSTRACT

A pulse applied to DC restoring networks associated with the grid electrodes of a color kinescope for biasing the same is maintained at a relatively constant amplitude. The constant amplitude is provided for by means of a unidirectional current-conducting device coupled to the output electrode of a blanking amplifier, and used to control the pulse amplitude at the output electrode as further applied to the DC restorers. The unidirectional device limits the voltage excursions of the pulse when the device is caused to conduct, due to the bias impressed thereon. The action serves to regulate the bias voltage applied to the kinescope grids via the DC restoring networks independent of amplitude variations in the pulse as applied to the input electrode of the blanking amplifier and amplitude variations due to tolerances and aging of the blanking amplifier associated components.

8 Claims, 1 Drawing Figure

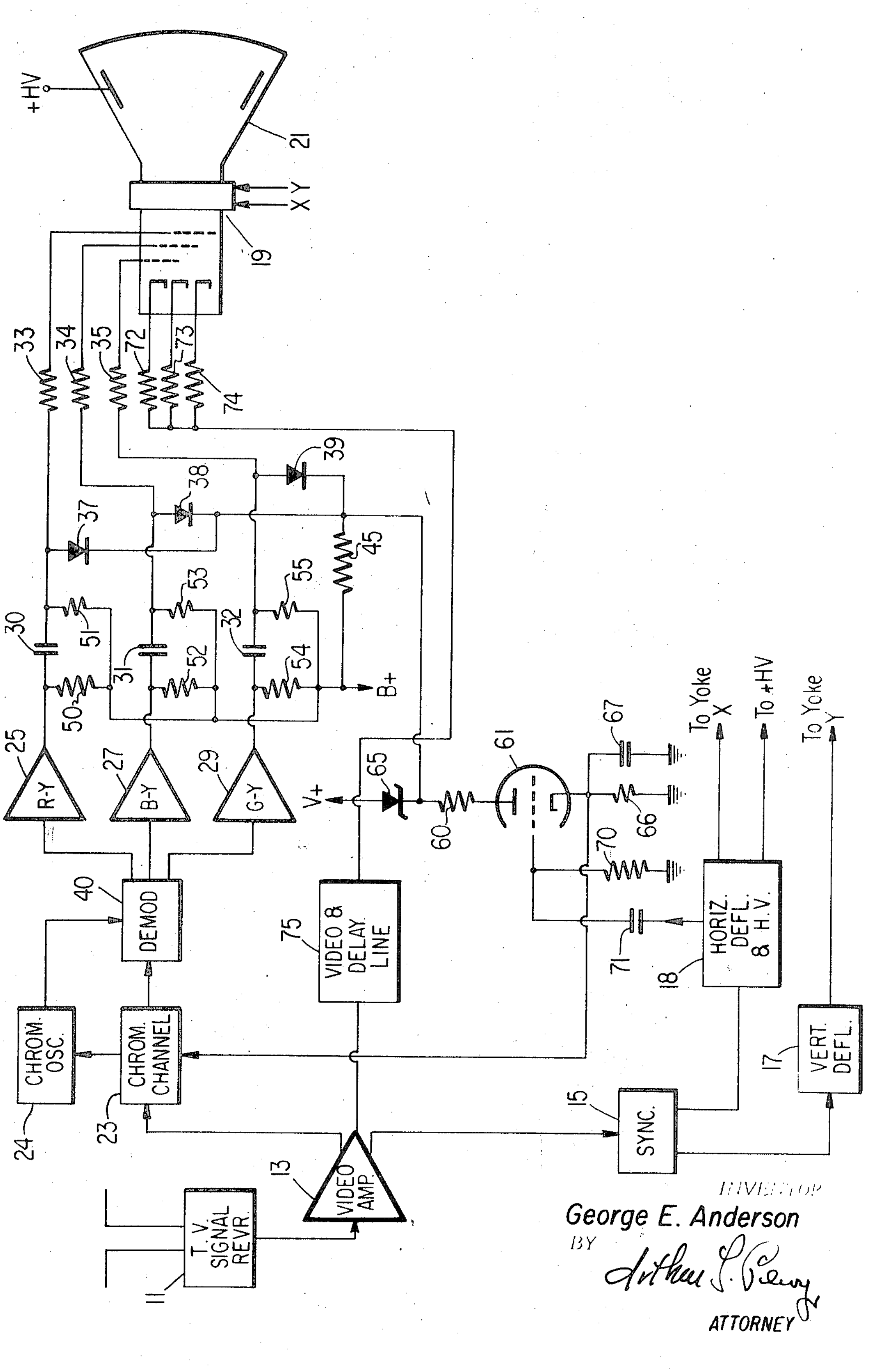
INVENTOR
George E. Anderson
BY
ATTORNEY

KINESCOPE BIAS ARRANGEMENT TO PROVIDE BOTH CONSTANT AMPLITUDE DC RESTORATION PULSES AND ARC DISCHARGE PROTECTION

STABILIZED BIASING ARRANGEMENTS FOR KINESCOPES

This invention relates to color television receivers and more particularly to stabilizing circuits for biasing of a kinescope employed therein.

In many conventional color television receivers, for economical reasons, the horizontal circuitry included therein is not particularly well regulated against line voltage variations or load variations. In general, such regulation properties result in an increase or decrease of operating potentials to the kinescope and in an increase or decrease of various pulse waveform amplitudes supplied by the horizontal deflection circuitry. These waveforms are used, for example, in biasing the kinescope and in providing a pulse bias source for DC restoring circuits which are usually coupled to the grid electrodes of the kinescope.

The DC restoring circuits as utilized permit the television receiver designer to desirably provide a DC coupled luminance channel path to the cathodes of the kinescope and to provide signal path coupling capacitors at the grid electrodes of the kinescope for application thereto of the color difference signals. The coupling capacitors, as provided, operate in conjunction with diode clamping circuits in DC restoring networks. The function of such DC restoring networks is to charge those capacitors coupled to the grids during the horizontal retrace time to a voltage level, which when taken with respect to the voltage impressed upon the cathodes serves to quiescently bias the kinescope in a desired operating region. This is necessary for optimumly displaying the video information to provide a relatively bright white reference tracking video display. In any event if the quiescent grid bias varies with respect to the cathode, the quiescent operating point would vary accordingly, thus affecting the linearity and the tracking qualities of the final display. Such variations can occur during power line voltage variations or during operating variations of the color receiver. For example, line voltage variations may result in a disproportionate change in amplitude of the horizontal pulse as applied to the DC restoring networks associated with the grid electrodes of the color kinescope. Such changes in amplitude would, therefore, provide a corresponding disproportionate change in the magnitude of the voltage developed across the coupling capacitors. Variations from device to device in the blanking amplifier will also cause variations in the horizontal pulse amplitude. This, in turn, would effectively change the biasing point of the color kinescope. During other conditions where the kinescope may be operating in a maximum beam current mode, the increase in beam current required by the kinescope will undesirably serve to load the horizontal deflection and output circuitry which would result in an incorrect bias. In order to compensate for such variations in the pulse amplitude many prior art receivers utilize a variable control in order to change the effective amplitude of the horizontal pulse as applied to the DC restorers associated with the grids of the kinescope. The addition of such a potentiometer increases the cost of the receiver and requires additional wiring within the receiver chassis. In the design of a moderately priced color television receiver it would be desirable to control the amplitude of the horizontal pulse as applied to the DC restorers in order to maintain the grid to cathode bias at the desired level and relatively constant without the need for providing additional controls or manually operated impedance devices.

It is, therefore, an object of the present invention to provide improved apparatus for controlling and maintaining the amplitude of a pulse applied to DC restoring networks included in a color television receiver relatively constant.

A further object of the present invention is to provide an amplitude-stabilized pulse source for determining and maintaining a desired and relatively constant bias between the grid and cathode electrodes of a color kinescope.

These and other objects of the present invention are provided for in one embodiment by utilizing a unidirectional current-conducting device as a diode, as part of the plate load of a blanking tube normally included in a television receiver. The diode device operates to maintain the amplitude of the pulse as applied to the DC restoring networks also coupled to the plate electrode of the blanking tube at a predetermined relatively constant value independent of normal voltage variations, line variations and tube variations anticipated during receiver operation. This action assures that the bias between the grid and the cathode electrode of the kinescope is maintained relatively constant during operating conditions and further serves to so operate in spite of load variations and tube and component variations as effecting the actual magnitude of the blanking pulse as applied, for example, to the input of the blanking tube.

Other objects and advantages of the present invention will readily be appreciated by those skilled in the art after a reading of the following specification taken in conjunction with the accompanying drawing in which the sole FIGURE illustrates in block and schematic form a color television receiver incorporating apparatus in accordance with an embodiment of the present invention for providing a predetermined relatively constant grid to cathode bias for a color kinescope.

A color television receiver is illustrated with the usual head end structure including RF amplifier, converter, IF amplifier, and video detector designated generally by the block labeled TV signal receiver 11. The detected composite color television receiver output of the signal receiver is applied to a video amplifier 13 having a plurality of separate outputs. One of the video amplifier outputs is applied to a sync separator 15 for recovery of the deflection synchronizing components of the composite signal, which synchronizing components are applied to horizontal and vertical deflection circuits 18 and 17, respectively. The deflection circuits serve to develop suitable deflection waveforms for energizing the respective horizontal and vertical windings of the deflection yoke 19. The deflection yoke 19 is provided to effect suitable deflection of the electron beams of color kinescope 21 which serves as the color image reproducer of the receiver. The illustrated color kinescope 21 is of the well-known three-gun shadow mask type reproducer. Another output of the video amplifier 13 is supplied to a chrominance channel 23 which conventionally includes suitable apparatus for selecting the modulated color subcarrier component of the composite signal, amplifying the selected signal component and synchronously detecting the amplified modulated color subcarrier component. Associated with the subcarrier detecting apparatus of the chrominance channel 23 is a local source of reference oscillations 24 of a color subcarrier frequency, suitably synchronized in accordance with the color synchronizing component of the composite signal for achieving proper detection. The subcarrier demodulation apparatus 40 may include suitable matrixing apparatus for combining the synchronous detector outputs to achieve production of the desired color difference signal outputs. In the illustrated embodiment of the FIGURE these outputs comprise three individual color difference signals of the form R-Y, B-Y, and G-Y appearing respectively at the output terminals of the amplifier drivers 25, 27 and 29. These signals are respectively coupled to the three grids of the kinescope 21 via coupling capacitors 30, 31, and 32, in series with resistors 33, 34, and 35 which resistors are used for limiting energy transfers involved in kinescope arcing. The junction between the capacitors and the current-limiting resistors as capacitor 30 and resistor 33, is coupled to the anode of a clamping diode, respectively referenced as 37, 38, and 39; each one of which is associated with a separate one of the grid electrodes.

The cathodes of the diodes used in the DC restoring networks are coupled via resistor 45 to a source of positive operating potential. The junction between the respective cathodes of the diodes 37 to 39 and resistor 45 is coupled to the plate electrode of the horizontal blanking tube 61 via resistor 60. B+ is provided for the plate electrode of this tube via the connection through resistor 45 to the aforementioned B+ supply. A diode 65 has its cathode wired to the junction between resistors 60 and 45 and its anode coupled to a source of operating potential designated as V+. The operating potential source V+ is of a lower positive potential than the aforementioned source B+. The horizontal blanking tube 61 has a cathode electrode coupled to ground through a resistor 66 which is bypassed by a capacitor 67. The cathode electrode is also coupled to an input of the chrominance channel 23 to provide burst elimination or burst blanking thereto. The grid electrode of the blanking tube 61 has a grid leak resistor 70 coupled between said grid electrode and a point of reference potential. A capacitor 71 couples the grid electrode to an output terminal of the horizontal deflection and high-voltage circuit 18. The capacitor 71 serves to provide a coupling path for a horizontal pulse developed in the horizontal deflection and high-voltage circuitry 18 during the retrace interval, which pulse is utilized for energizing the blanking tube 61. The aforementioned DC restoring networks include the diodes 37 to 39 also include load resistors 50, 52, and 54 which are coupled to the drive side or the output terminals of the amplifiers 25, 27, and 29. Biasing resistors 51, 53, and 55 are coupled between the respective anodes of diodes 37 and 39 and the B+ source, and with resistors 50, 52, and 54 serve to provide adequate charge and discharge paths for the DC restoring networks including the diodes 37 to 39. Another output of the aforementioned video amplifier 13 is applied to subsequent video amplifier and delay line stage 75. The output of video amplifier and delay line stage 75 is used to drive the cathode electrodes of the kinescope 21 via resistors 72, 73, and 74 respectively. This path is DC-coupled to the cathodes; and the quiescent bias on the output video amplifier provides cathode bias for the kinescope 21, which when taken with respect to that bias applied to the grids via the DC restoring networks, serves to operate the kinescope 21 in a predetermined relatively linear region. The operation of the bias-stabilizing circuit will now be explained in greater detail.

During the line interval, the blanking tube 61 is maintained cut off and the potential at the junction between resistor 60 and the cathode of diode 65 is essentially at the B+ level. The diodes 37 to 39 are reverse-biased during this interval and no charge is added across capacitors 30, 31, and 32. During the blanking interval, the blanking tube 61 is gated on by means of a positive pulse from the horizontal deflection and high-voltage circuit 18, which pulse is coupled to the grid electrode of blanking tube 61 via the coupling capacitor 71. The plate electrode goes from the B+ value to a more negative value or towards reference potential. As the voltage at the cathode of diode 65 goes towards reference potential, diode 65 becomes forward-biased and the voltage at the cathode is clamped to the V+ level, thus determining the maximum negative swing of the pulse applied to the clamping diodes 37, 38, and 39. This negative polarity pulse causes the diodes to conduct, thus charging the capacitors 30, 31, and 32 more negative with respect to the B+ referenced thru resistors 51, 53, and 55 which voltage is applied to the kine grids via resistors 33, 34, and 35. The difference between the grid voltage and the cathode voltage determines the quiescent bias for the kinescope 21. The time constant of the capacitors 30, 31, and 32 and the respective resistors 50, 51 52, 53, 54, and 55 associated with each grid determine the time constants of the DC restoring network, which time constants are sufficient to maintain the charge across the capacitors relatively constant for the entire line interval.

As can be seen from the above description of operation, while the amplitude of the keying pulse, as applied to the grid electrode of the blanking tube 61 via the coupling capacitor 71, may vary undesirably due to various loading conditions of the kinescope or of the horizontal deflection circuitry 18, and the plate pulse may vary due to blanking tube current variations and circuit component variations, it is always of a sufficient magnitude to cause the diode 65 to commence forward conduction. The voltage at the junction of resistors 60 and 45 become clamped to the V+ supply during the negative swing and the amplitude of the pulse as applied to the DC restorers remains constant as being essentially equal to the difference between B+ and V+. This predetermined relatively constant amplitude pulse is then used to charge the respective capacitors via the DC restoring or clamping diodes 37 to 39. In this manner, the grid to cathode voltage of the kinescope is maintained relatively constant at a predetermined level in spite of any variations which may effect the amplitude of the pulse emanating from the horizontal deflection and high-voltage circuit 18. This circuit also compensates for variations in tube and component values.

It is also noted that in the FIGURE the schematic symbol representing the diode 65 indicates the diode 65 is preferably selected to be a zener device. Essentially, the diode 65 as a zener will operate as described previously for the biases described and will conduct current as a conventional diode. However, in the zener direction the diode 65 affords protective operation during kinescope arcs which may couple through diodes 37 to 39 separately or jointly. When the kinescope experiences an arc to the grid electrode circuits and the arc is in the positive direction this causes one or more of the DC restoring diodes 37 to 39 to conduct. This positive pulse when applied to the junction between resistor 60 and the cathode of diode 65 causes diode 65 to conduct as a zener. The zener action of the diode limits the effective amplitude of any pulse which appears at the junction between resistors 60 and the cathode of diode 65, thus protecting the vacuum tube 61 and the diodes 37 to 39 from excessive inverse amplitude pulses which might otherwise cause those devices to break down. Such a protection scheme would be particularly advantageous when utilized in a transistorized receiver wherein vacuum tube 61 may be replaced by a transistor device which is, therefore, more susceptible to voltage breakdown. By maintaining the amplitude of the blanking pulse as applied to the DC restoring networks as described above, the set designer now can be assured of a constant amplitude pulse used for determining the grid to cathode bias for the kinescope, and hence avoid the necessity of including separate potentiometers used for determining and controlling the magnitude of the blanking pulse as evidenced by many prior art receivers. The diode may preferably be utilized to perform amplitude control for the horizontal blanking pulse and further provide arc protection for the DC restoring networks, thus protecting the clamping diodes 37 to 39 while further protecting the active device such as blanking amplifier 61 utilized in the blanking section of the television receiver. Furthermore, if desired, by selecting the zener rating to be greater than the difference between the B+ and V+ supplies the diode 65 is off during the line interval, if there is no kinescope arcing and hence draws no current and dissipates no power.

Apparatus designed according to an embodiment of the above-described invention used the following components by way of example:

| | | |
|---|---|---|
| Resistors | 33 | 3900 ohms |
| | 34 | 3900 ohms |
| | 35 | 3900 ohms |
| | 45 | 10,000 ohms |
| | 50 | 15,000 ohms |
| | 51 | 2.2 megohms |
| | 52 | 39,000 ohms |
| | 53 | 2.2 megohms |
| | 54 | 15,000 ohms |
| | 55 | 2.2 megohms |
| | 60 | 2700 ohms |
| | 66 | 1000 ohms |
| | 70 | 100,000 ohms |
| | 72 | 3900 ohms |
| | 73 | 3900 ohms |
| | 74 | 3900 ohms |
| Capacitors | 30 | 0.01 microfarads |
| | 31 | 0.01 microfarads |
| | 32 | 0.01 microfarads |
| | 67 | 820 micromicrofarads |
| | 71 | 240 micromicrofarads |
| Triode | 61 | 1/2 6GH8A |
| Diode | 65 | 180 volt zener |
| V+ | | +130 volts |
| B+ | | +280 volts |

| | |
|---|---|
| Kinescope 21 | 15 NP 22 or 17 EZP 22 |

What is claimed is:

1. In a color television receiver including a color kinescope of the type employing a plurality of electron guns, each one of which has a grid and cathode electrode for controlling the intensity of a beam produced by said gun in accordance with the potential difference between said grid and cathode electrodes, said receiver including a source of video signals having an output terminal direct coupled to said cathode electrodes and a plurality of sources of color difference signals, each one of which is separately coupled via a capacitor to a separate one of said grid electrodes, said receiver further including a plurality of clamping diodes having one electrode coupled in common and a second separate electrode coupled to a junction between a grid electrode of said kinescope and said capacitor, said common terminal of said diodes being directly coupled to the output electrode of an amplifier device having an input electrode coupled to a source of pulses included in said receiver and developed by horizontal deflection circuitry responsive to a synchronizing interval occurring in said video signal, said pulse as applied to said input electrode of said amplifier device being subjected to variations in amplitude due to undesirable operating conditions of said receiver, in combination therewith, apparatus for controlling the amplitude of said pulse as applied to said common terminal of said diodes, comprising:

a. a first source of DC operating potential having a predetermined magnitude, b. a resistor coupled between said first source of operating potential and said common terminal of said diodes, c. a second source of operating potential having a second DC potential magnitude selected in accordance with said predetermined magnitude and different therefrom, d. a unidirectional current-conducting device coupled between said common terminal and said second source of operating potential and biased with respect to said magnitudes of said first and second sources to be normally nonconducting, said unidirectional current device caused to conduct during said synchronizing interval when said pulse as applied to said input electrode of said amplifier device causes the amplified pulse at said output electrode of said amplifying device to reach a DC level substantially equal to the magnitude of said second source, whereby said pulse as applied to said common terminal of said diodes has a magnitude substantially determined by the difference between said first and second DC potential magnitudes, substantially independent of any variations in the amplitude of said pulse as applied to said input electrode of said amplifier device.

2. The apparatus according to claim 1 wherein said unidirectional current-conducting device is a diode having a cathode electrode coupled to said common terminal of said clamping diodes and a anode electrode coupled to said second source of operating potential.

3. The apparatus according to claim 1 wherein said unidirectional current conduction device is a zener diode having a cathode electrode coupled to said common terminal of said clamping diodes and an anode electrode coupled to said second source of operating potential, said zener voltage rating of said diode selected of a magnitude with respect to the characteristics of said amplifier device and said clamping diodes, to conduct in the zener direction for kinescope arcs of a polarity determined by the polarity of said zener breakdown voltage.

4. In combination:

a. a color kinescope of the type employing a plurality of electron guns each one of which has a grid and cathode electrode for controlling the intensity of a beam produced by said gun in accordance with the potential difference between said grid and cathode electrodes, b. a source of video signals having an output terminal direct coupled to said cathode electrodes for providing a predetermined quiescent DC bias thereto, c. a plurality of sources of color difference signals, d. a plurality of capacitors each one of which is separately coupled between one of said color difference signal sources and one grid electrode of said kinescope, e. a plurality of clamping devices each having one terminal coupled in common and another terminal coupled to a junction between a grid electrode of said kinescope and said associated capacitor, f. an amplifying device having an input, output and common electrode, g. means coupling said output electrode of said amplifying device to said common terminal of said clamping devices, h. means coupling said common electrode of said amplifying device to a point of reference potential, i. a source of first operating potential, j. means coupling said output electrode of said amplifying device to said source of first operating potential.

k. a source of second operating potential different from said first, l. a unidirectional current-conducting device having first and second terminals, said first terminal coupled to said output electrode of said amplifying device and said second terminal coupled to said source of second operating potential.

m. means coupled to said input electrode of said amplifying device for supplying a pulse thereto to cause an amplified pulse to appear at said output electrode of a polarity to cause said clamping devices to conduct to charge said capacitors and of a magnitude to cause said unidirectional current device to conduct to limit the amplitude of said pulse to be equal to substantially the difference between said first and second operating potentials relatively independent of the amplitude of said pulse as applied to said input electrode of said amplifying device, whereby the voltage across said capacitors and therefore the grid to cathode voltage of said kinescope is relatively constant.

5. The combination according to claim 4 wherein said source of first operating potential is approximately two times more positive in potential magnitude than said source of second operating potential.

6. The combination according to claim 4 wherein said unidirectional current-conducting device is a zener diode having a cathode terminal coupled to said output electrode of said amplifying device and an anode electrode coupled to said source of second operating potential, and having a zener breakdown voltage rating greater than the difference between the magnitude of said first and second operating potential sources to limit pulses of a polarity sufficient to cause zener breakdown to an amplitude at said output electrode of said active device substantially equal to said zener rating.

7. The combination according to claim 4 wherein said amplifying device is a triode having a grid input electrode, a cathode common electrode and a plate output electrode.

8. The combination according to claim 7 wherein said plurality of clamping devices are diodes having a common cathode electrode terminal connection and an anode electrode terminal connection coupled to a junction between a grid electrode of said kinescope and said associated capacitor.

* * * * *